United States Patent
Kelly et al.

[15] 3,670,843

[45] June 20, 1972

[54] SANDWICH STRUCTURE

[72] Inventors: John C. Kelly, Hemington House near Shardlow; Christopher J. Moore, Derby, both of England

[73] Assignee: Rolls Royce Limited, Derby, England

[22] Filed: Nov. 12, 1969

[21] Appl. No.: 875,721

[30] Foreign Application Priority Data

Nov. 23, 1968 Great Britain.....................55,661/68

[52] U.S. Cl. .......................................181/33 G, 181/33 HB
[51] Int. Cl. ..........................................................F01n 7/16
[58] Field of Search...........181/33 G, 33 GA, 33 HA, 33 HB, 181/33 K

[56] References Cited

UNITED STATES PATENTS

| | | | |
|---|---|---|---|
| 3,160,549 | 12/1964 | Caldwell et al.....................181/33 GA |
| 3,211,253 | 10/1965 | Gonzalez............................181/33 GA |
| 3,439,774 | 4/1969 | Callaway et al.....................181/33 G |

FOREIGN PATENTS OR APPLICATIONS 863,611   3/1961   Great Britain.......................181/33 G Primary Examiner—Richard B. Wilkinson
Assistant Examiner—John F. Gonzales
Attorney—Cushman, Darby and Cushman

[57] ABSTRACT

A sound absorptive liner for use in gas turbine engines consists of a sandwich structure which has two layers of cellular material separated by a porous layer and an impervious layer attached to the outer face of one of the layers of cellular material.

2 Claims, 7 Drawing Figures

PATENTED JUN 20 1972

3,670,843

SHEET 1 OF 2

Inventors
JOHN C. KELLY
CHRISTOPHER J. MOORE
By
Cushman, Darby & Cushman
Attorney

SANDWICH STRUCTURE

This invention relates to a sandwich structure for example, a sound absorptive sandwich structure which may be used to line the wall of a by-pass or fan duct of a gas turbine engine.

According to the present invention there is provided a sound absorptive sandwich structure including a first layer of cellular material, a porous layer supported on the first layer of cellular material, a second cellular layer supported on the porous layer and an impervious layer supported on the second cellular layer.

The impervious layer may be formed from an elastic material in a single layer or a laminate having two elastic layers enclosing a viscous layer.

The porous layer may comprise an impervious plate pierced by an array of holes, or a number of laminae of glass fiber cloth bonded together or a fibrous metal structure.

One or both of the cellular layers may be formed from a metal honeycomb.

Figure 1:
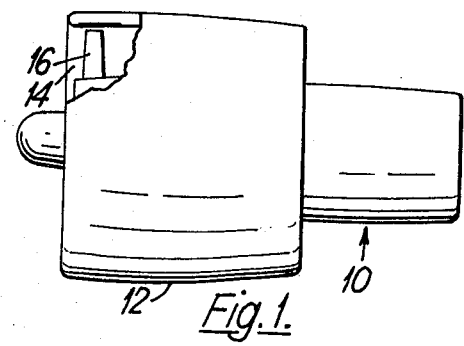
Figure 2:
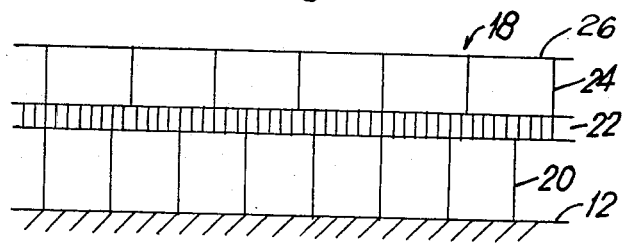
Figure 3:
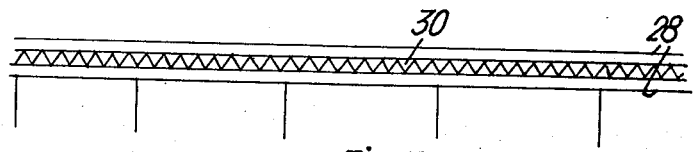
Figure 4:
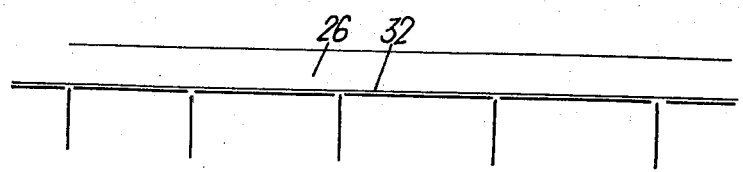
Figure 5:
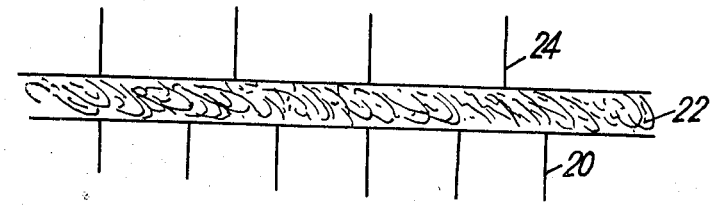
Figure 6:
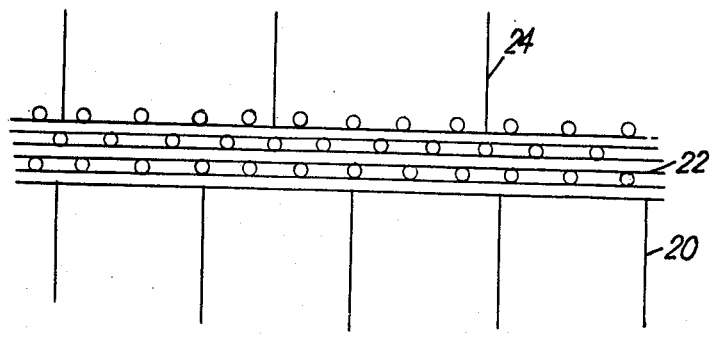
Figure 7:
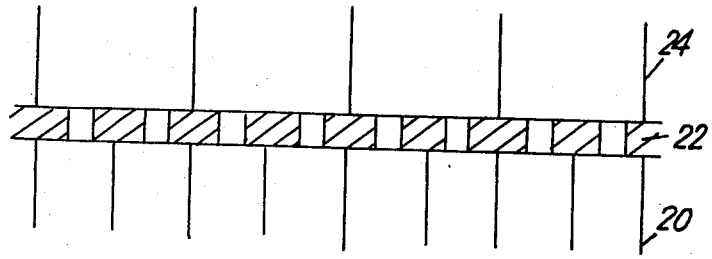

The invention will now be more particularly described with reference to the accompanying drawings in which:

FIG. 1 is a diagrammatic elevation of a gas turbine to which one form of the invention is applied, FIG. 2 is a diagrammatic representation of one form of sound absorptive sandwich structure according to the present invention, FIG. 3 shows an alternative arrangement of the outer skin of the structure shown in FIG. 2, FIG. 4 shows a further alternative arrangement of the outer skin, FIG. 5 shows one arrangement of the inner skin of the structure, FIG. 6 shows an alternative arrangement of the inner skin and FIG. 7 shows a further alternative arrangement of the inner skin.

In the figures, a gas turbine engine 10 includes a housing 12 defining a duct 14 in which a fan 16 rotates. A lining structure 18 is secured to the inner wall of the housing 12 and is in the form of a sandwich which comprises a first honeycomb layer 20, a porous layer 22, a second honeycomb layer 24 and an impervious layer 26 (FIG. 2), the layers being secured to each other.

The impervious layer 26 is a thin smooth membrane such as a Mellinex (Registered Trade Mark) or stainless steel. The layer can be an elastic material and in FIG. 3 comprises two layers of an elastic material 28 enclosing a viscous layer 30. The layer 26 is preferably coated with a self-adhesive material 32 on its surface facing the honeycomb 24 so that it can be easily attached to the honeycomb.

In FIG. 5, the porous layer consists of strands of wire compressed into a flat sheet such as Feltmetal (Registered Trade Mark).

In FIG. 6, the porous layer consists of layers of woven glass fiber cloth which are laid up at an angles to each other and are resin bonded together.

The construction of the porous layers described with reference to FIGS. 5 and 6 is such that the fluid medium contained in the layers 20, 24 in passing from one of these layers to the other has to take a tortuous path when passing through the porous layer thus losing energy.

In FIG. 7, the porous layer 22 consists of an impervious plate which is pierced with an array of holes.

The two honeycomb layers 20, 24 are preferably made of stainless steel although other suitable materials can be used and the layers may be of differing cell sizes.

In use acoustic energy generated by the engine 10 is transmitted through the fluid flowing in the duct 14 and is absorbed by the structure 18 by hysteresis losses in the vibrating membrane 26, irreversible work done on the fluid in the duct adjacent the membrane, irreversible work done on the fluid between the membrane and the porous layer 22, friction losses in the porous layer and friction losses on the walls of the cellular layer 20.

The self adhesive layer 32 ensures that if the membrane is fractured the exposed edges will stick to the cellular layer 24 and irreversible work done in extension and contraction of the self adhesive layer will contribute to the hysteresis losses in the vibrating membrane.

In the arrangement shown in FIG. 3 the irreversible work done in shear of the viscous material 30 will also contribute to the hysteresis losses in the vibrating membrane.

The provision of a smooth impervious membrane reduces the resistance of the lining to flow of fluid through the duct and eliminates the problems of clogging and wicking caused by contaminated fluid.

The acoustic stiffness of the lining can be adjusted by altering the tension in the membrane and the dimensions of both of the cellular layers 20, 24.

In a conventional lining which may comprise a porous layer supported on a honeycomb structure the acoustic mass of the system is the mass of fluid in the porous layer and part of the fluid in the honeycomb structure. In the present arrangement the acoustic mass also depends on the mass of the membrane which can be adjusted by altering the density and thickness of the membrane material, and/or by the dimensions of the honeycomb 24.

In the conventional liner the resonant frequency is controlled by the ratio of stiffness to the mass of fluid in the honeycomb. In the present arrangement the resonant frequency may be controlled by the ratio of the stiffness of the fluid in the first honeycomb layer 20 to the mass of the membrane 26 and since the resonant frequency is no longer controlled solely by the depth of the first honeycomb 20 this depth may therefore be reduced with a consequential saving in space.

Also, the fluid between the membrane and the housing 12 need not be identical with the fluid in the duct and thus the resonant frequency of the lining can be adjusted by altering the type of fluid in the lining.

The present invention is stated to include a porous layer but it is envisaged that this layer can be eliminated while still maintaining a comparable acoustic performance.

The lining according to the invention has been described with reference to a duct of a gas turbine engine but it is equally applicable to any duct or enclosure in which acoustic energy is transmitted to the wall of the duct or enclosure through a stationary or moving mass of fluid. The lining may be used in relation to acoustic sources inside or outside the duct.

Again, the use of the impervious membrane 26 allows that dimension of the cellular structure in the mean direction of motion of the fluid to be increased, without incurring extra resistance due to recirculation of the fluid through the porous layer.

We claim:

1. A sound absorptive sandwich structure including a first layer of cellular material, a porous layer supported on the first layer of cellular material, a second cellular layer supported on the porous layer, both of said cellular layers having rigid sidewalls and an impervious layer supported on the second cellular layer, said impervious layer being formed as a laminate of two outer elastic laminas and an inner viscous lamina.

2. A sound absorptive sandwich structure including a first layer of cellular material, a porous layer supported on the first layer of cellular material, said porous layer comprising a plate formed with a larger number of closely spaced apertures, and second cellular layer supported on the porous layer, both of said cellular layers having rigid sidewalls, and an impervious layer supported on the second cellular layer.

* * * * *